United States Patent [19]
Naudin et al.

[11] Patent Number: 5,105,681
[45] Date of Patent: Apr. 21, 1992

[54] DAMPED FLYWHEEL FOR AN AUTOMOTIVE TRANSMISSION

[75] Inventors: Jacky Naudin, Ermont; Jacques Paquin, Villeneuve-La-Garenne, both of France

[73] Assignee: Valeo, Paris, France

[21] Appl. No.: 370,865

[22] Filed: Jun. 23, 1989

[30] Foreign Application Priority Data

Jun. 30, 1988 [FR] France ............... 88 08844

[51] Int. Cl.⁵ .................... F16F 15/10; F16D 3/12
[52] U.S. Cl. ......................... 74/574; 74/572; 192/106.2; 464/67; 464/68
[58] Field of Search ............. 74/574, 572; 192/106.2; 464/67, 68, 66

[56] References Cited

U.S. PATENT DOCUMENTS

| | | | |
|---|---|---|---|
| 4,663,983 | 5/1987 | Kobayashi et al. | 74/574 |
| 4,668,207 | 5/1987 | Koshimo | 192/106.2 X |
| 4,727,970 | 3/1988 | Reik et al. | 74/574 X |
| 4,816,006 | 3/1989 | Friedmann | 74/574 X |
| 4,850,932 | 7/1989 | Kagiyama et al. | 74/574 X |
| 4,857,032 | 8/1989 | Aiki et al. | 464/68 |
| 4,876,917 | 10/1989 | Aiki et al. | 192/106.2 |
| 4,899,617 | 2/1990 | Kobayashi et al. | 74/574 |
| 4,904,225 | 2/1990 | Worner et al. | 464/67 |

FOREIGN PATENT DOCUMENTS

| | | | |
|---|---|---|---|
| 2565650 | 12/1985 | France | 74/574 |
| 2568638 | 2/1986 | France | 74/574 |
| 2571461 | 4/1986 | France | 74/574 |

Primary Examiner—Vinh T. Luong
Attorney, Agent, or Firm—Charles A. Brown

[57] ABSTRACT

A damped flywheel which comprises a primary part and a secondary part rotatably mounted with each other. A first annular component is associated with the primary part. A second annular component is associated with the second part. Resilient springs are disposed between and in engagement with the first and second annular components. The first annular component is mounted to define a dead clearance in which there is no operation of the resilient spring and an abutment defines the range of annular displacement of the dead clearance.

8 Claims, 1 Drawing Sheet

DAMPED FLYWHEEL FOR AN AUTOMOTIVE TRANSMISSION

BACKGROUND OF THE INVENTION

1. Field of the Invention

This invention is concerned with damped flywheels for transmissions, especially for automotive vehicles. In particular, it is concerned with such damped flywheels comprising two coaxial parts, namely a primary part and a secondary part, which are mounted rotatably with respect to each other, and further comprising resilient means acting circumferentially between two annular components, each of which is associated with a respective one of the primary and secondary parts.

2. Description of the Prior Art

Damped flywheels of the above kind are described for example in U.S. Pat. No. 4,663,983 and French published patent document FR 2 571 461A.

For certain applications at least, it is desirable to obtain the lowest possible characteristic frequency for the flywheel, so that this frequency is as different as possible from that obtained when the engine of the vehicle is operating in reverse. This characteristic frequency depends mainly on the stiffness of the resilient means employed. It also depends on the clearance, commonly called dead centre clearance, which is usually provided in the vicinity of dead centre. There is no operation of resilient means during the angular displacement which takes place while this clearance is being taken up, and the equivalent stiffness of the assembly is thus reduced, and thus also the characteristic frequency.

In the above mentioned patent documents, the dead centre clearance occurs partly between one of the annular components concerned and partly between the resilient means. The relevant annular components consists in practice of a damper plate which is provided with arms arranged to act between the resilient means, the latter being jointly retained and engaged endwise by the other one of the annular components, which comprises two rings normally referred to as guide rings. A consequence of such an arrangement is that the dead centre clearance is detrimental to the space which is available for location of the resilient means, and this in turn limits their circumferential length.

It is also possible to reduce the stiffness of the resilient means by increasing their length, but this has the effect of reducing the dead centre clearance.

It has therefore not been possible to address the disadvantageous effects of one of these factors without producing a correspondingly detrimental effect on the other.

SUMMARY OF THE INVENTION

An object of the present invention is to provide a damped flywheel which resolves this dilemma.

The damped flywheel according to the invention is of the kind clearly described in detail below, and is generally characterised in that, within the predetermined limits of angular displacement between the annular components, that one of the latter which is associated with the primary part is freely rotatably mounted with respect to the primary part.

It is thus between that annular component and another annular component of the primary part that the dead centre clearance is defined, so that the latter is thereby dissociated from the resilient means. The resilient means can therefore be of whatever circumferential length may be desirable without detracting from the required dead centre clearance.

The features and advantages of the invention will appear more clearly from the description which follows, and which is given by way of example with reference to the accompanying drawings described below:

DESCRIPTION OF THE PREFERRED EMBODIMENT

Figure 1:
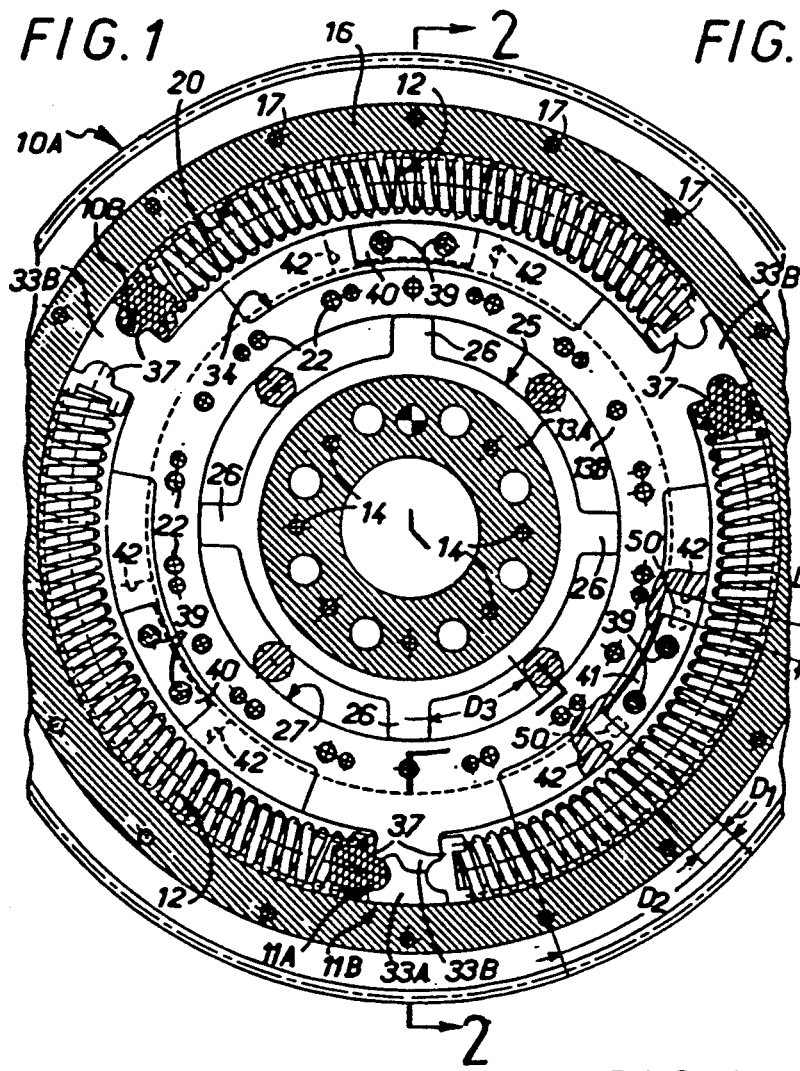
FIG. 1 is a partial view, seen partly in elevation and partly in cross section with certain local areas shown cut away, and shows a damped flywheel according to the invention, the cross section being generally taken on the line 1—1 in FIG. 2.
Figure 2:
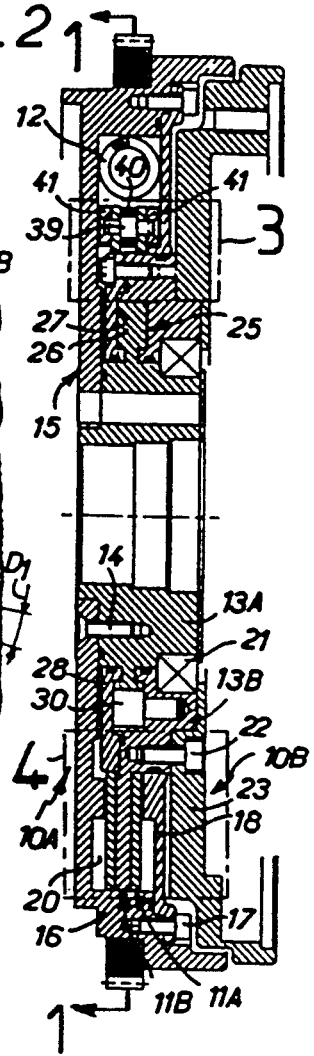
FIG. 2 is a view in axial cross section of the same damped flywheel the cross section being that represented by the lines 2—2 in FIG. 1.
Figure 3:
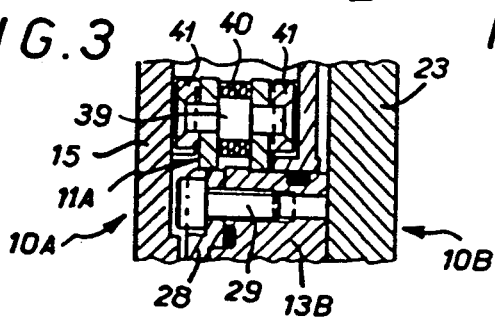
FIGS. 3 and 4 repeat on a larger scale those details of FIG. 2 enclosed in the phantom boxes at 3 and 4 respectively in FIG. 2.
Figure 4:
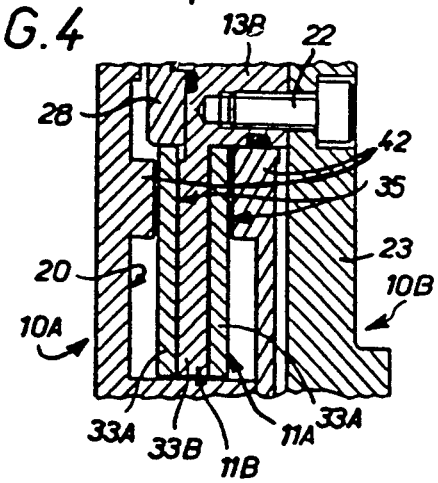

As is shown in the drawings, the damped flywheel in accordance with the invention comprises two coaxial parts, namely a primary part 10A and a secondary part 10B, mounted so as to be rotatable with respect to each other. The parts 10A and 10B are associated, respectively, with two annular components 11A and 11B, while a plurality of resilient means, each engages, of components 11A and 11B, act circumferentially between the two parts 10A and 10B. In this example these resilient means are in the form of coil springs 12. Also in this example, there are three of these springs 12, which extend in the circumferential direction on a common pitch circle of the assembly, and which are also spaced apart at regular intervals along this pitch circle.

The primary part 10A includes a hub 13A, on which a plate 15 is secured by means of screws 14. The plate 15 includes a peripheral, axially extending flange portion 16, carrying a counter plate 18 which is secured by means of screws 17 to the end of the flange 16.

The counter plate 18 extends radially towards the axis of the assembly, but only by a limited extent. An annular cage 20 is defined by the counter plate 18 and the plate 15. The springs 12 are mounted within this cage, and all the components 13A and 14 to 18 form part of the coaxial part 10A.

The secondary coaxial part 10B includes another hub, which is denoted by the reference numeral 13B. The hub 13B is separated from the hub 13A by a rolling bearing 21, and lies coaxially partly within the counter plate 18, so that it delimits the cage 20 on the side thereof nearest to the axis of the assembly. On the side of the hub 13B opposite to the primary coaxial part 10A, screws 22 secure a plate 23 which is adapted to act as a reaction plate for the clutch (not shown) of the transmission with which the assembly is associated.

In this example, a viscous damping device 25 is also provided between the primary part 10A and the secondary part 10B. The viscous damping device 25 includes a set of teeth 26, which extend radially from the hub 13A within a chamber 27 which is defined between the hubs 13A and 13B and a second counter plate 28. The counter plate 28 is secured by means of screws 29 to the hub 13B, on the same side of the latter as the plate 15. In the chamber 27, there are a number of boss elements fixed to the hub 13B. In this example these boss elements very simply comprise a set of pins 30 which are provided with a shank, fitted into holes in the hub 13B with an interference fit.

The chamber 27 contains a damping fluid, and appropriate seals are provided between the hub 13B and the 13A, and also between the counter plate 28 and each of the hubs 13A and 13B. In addition, the cage 20 contains grease, with seals being provided between the plate 15 and the hub 13A, between the counter plate 18 and the axially extending flange 16, and between the counter plate 18 and the hub 13B.

In accordance with the invention, one of the annular components 11A and 11B (in this example the component 11A) is associated with the primary coaxial part 10A of the damped flywheel is mounted for free rotation with respect to the latter. Like the springs 12, the annular components 11A and 11B extend into the cage 20.

The annular component 11B associated with the secondary coaxial part 10B is a damper plate which, in this example, extends integrally from the hub 13B, to which the damper plate is joined by its inner periphery. At its outer periphery, the damper plate has radial arms 33B, of which there are three in this example. The arms 33B are disposed at regular intervals in the circumferential sense, like the springs 12, and extend radially between the springs 12 and alternately with them. The damper plate, at its outer periphery, also has a plurality of slots 34 alternating with the radial arms 33B.

The freely rotatable annular component 11A associated with the primary coaxial part 10A comprises two guide rings 35 disposed one ither side of the damper plate 11B. Like the damper plate, the rings 35 have arms 33A. These correspond with the arms 33B of the damper plate and are disposed between the springs 12. Each spring 12 thus extends between one pair of adjacent radial arms 33A and 33B and another similar pair, with each arm 33A being axially aligned with its companion arm 33B in the normal or rest condition of the assembly which is shown in FIG. 1. Between each end of each of the springs 12 and the associated arms 33A, 33B, a spacing and centring insert in the form of a boss 37 is interposed, so as to bear snugly on the arms 33A and 33B, with which it is correspondingly profiled. In this exmmple, having regard to the circumferential length of the springs 12, the inserts 37 have no need to tilt when arranged as described, the springs having in the rest condition the same configuration as when they are subjected to centrifugal forces.

The rings 35 extend radially between the axial wall constituted by the flange 16 and the hub 13B. They are secured to each other at intervals, for simultaneous rotation, by spacers 39, which extend axially through openings constituted by the slots 34 in the damper plate 11B, there being two spacers 39 for each slot 34.

At least one of the spacers 39 (and preferably each of them) is in this example surrounded by a sleeve 40 of resilient material, which cooperates in abutting relationship with the flanks of the slot 34. In this example, each resilient sleeve 40 is common to a plurality of the spacers 39 and actually takes the form of a circumferentially elongated pad.

The rings 35 act angularly within the cage 20. At least one, and in this example each, of the rings 35 carries an axially projecting boss 41 which engages circumferentially with a fixed abutment surface 42 of the corresponding transverse wall of the cage 20, defined on the plate 15 or the counter plate 18. Each of these bosses 41 comprises in this example a circumferentially elongated pad which is carried on the respective ring 35 by at least one (two in this example) of the spacers 39 which secure that ring 35 to the other ring 35 for simultaneous rotation. There are thus, at intervals, three pads projecting from each ring 35, corresponding with each other and each having the same circumferential length as the corresponding sleeve member or pad 40 of resilient material.

The plate 15 has two of the abutment surfaces 42, projecting from it and disposed on either side of each of the bosses 41 of the corresponding ring 35. The counter plate 18 has the same arrangement. In this example, these abutment surfaces 42 are constituted by the ends of a plurality of circumferential webs formed integrally with the plate 15 and the counter plate 18. They could alternatively, however, be constituted by the pads secured on the latter. The bosses 41, and the abutment surfaces 42, extend around a pitch circle disposed radially inwardly of the pitch circle of the springs 12. As will be evident from the foregoing, the same applies to the spacers 39 and the resilient pads 40.

When the assembly is in its rest condition, the annular component 11A is circumferentially spaced from both of the abutment surfaces 42, so as to define the required dead centre clearance. Now let D1, measured angularly, be the circumferential distance separating each abutment surface 42 from the adjacent boss 41 under these circumstances. In this example, this will apply in both circumferential directions. Similarly, again with the assembly at rest, and measured under the same conditions, a common circumferential distance D2, substantially greater than D1, separates the flanks of the slots 34 from the resilient pads 40 in both directions; while a common circumferential distance D3, slightly greater than D2, separates the teeth 26 from the pins 30 in both directions.

Figure 5:
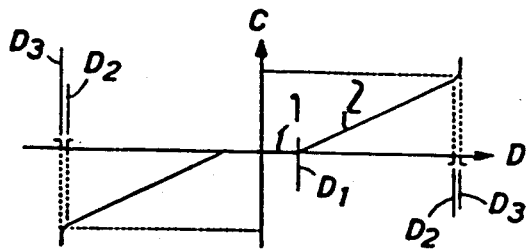
FIG. 5 is a diagram showing the operation of the damped flywheel according to the invention.

In operation, with the assembly operating in the forward driving direction, and ignoring the viscous damping function, there is an initial free rotation of the primary coaxial part 10A with respect to the secondary part 10B, as is indicated by the straight line 1 in the diagram of FIG. 5. In FIG. 5, the angular displacement D between the two parts 10A and 10B is shown as abscissa, while the ordinate represents the torque C which is transmitted between the two parts 10A and 10B.

This first stage of operation, in which the rings 35 pivot freely with respect to the plate 15 and counter plate 18, and in which the characteristic line 1 coincides with the abscissa, continues until the circumferential distance D1 has been taken up. At this point, the rings 35 comes into abutting engagement, through their bosses 41, with the corresponding abutment surfaces 42 of the plate 15 and counter plate 18.

The spring 12, which have played no part in the operation up to the point because they are supported between the arms 33B, now being to act, all in parallel with each other, between the arms 33A of the primary part 10A and the arms 33B of the secondary part 10B. The characteristic curve representing the corresponding function is then a straight line 2 having a gradient which is proportional to the stiffness of the springs 12. This second stage of operation continues until the circumferential distances D2 and D3 have in their turn been taken up, the distance D2 first, followed by D3.

The secondary part 10B is now positively driven by the primary part 10A. For operation in the reverse direction, the action is merely the reverse of that just described.

If desired, and indicated in dotted lines in FIG. 1, small pads 50 of resilient material, carried for example by the bosses 41 and/or the abutment surfaces 42, may be provided so as to act between the bosses 41 and surfaces 42.

It is of course immaterial whether the freely rotatable annular component consists of a single damper plate or of the two guide rings. It is also immaterial whether the other annular component is fixed, with respect to the coaxial part of the assembly to which it relates, by its inner or its outer periphery. It may also mesh, with a clearance, with the appropriate coaxial part, the dead centre clearance then being defined on both the primary and secondary parts. In addition, in place of the viscous damping device, or in cooperation with it, a torque limiter may be provided.

What is claimed is:

1. A damped flywheel comprising a primary part, a secondary part, means mounting said primary and secondary parts coaxially with ecah other and rotatably with respect to each other, a first annular component associated with the primary part, a second annular component associated with the secondary part, resilient means disposed between and in engagement with said first and second annular components for angular displacement therebetween, and means mounting said first annular component for defining a dead clearance in which there is no operation of the resilient means during the angular displacement between said primary and secondary parts while the dead clearance is being taken up in such a way as to be freely rotatable with respect to the primary part, said primary and secondary part and first annular component comprising abutment means for defining a predetermined range of angular displacement for said dead clearance, the first annular component comprising two rings disposed on either side of the second annular component, a plurality of spacers securing said rings together at intervals for simultaneous rotation, said spacers extending axially through openings defined in the second said annular component, with at least one pad of resilient material surrounding at least one of said spacers.

2. A damped flywheel according to claim 1, comprising an axial wall associated with said primary part and a hub associated with the secondary part, with said rings extending radially between said axial wall and hub.

3. A damped flywheel according to claim 2, wherein said resilient means comprise a plurality of springs, each of said first and second annular components including radial arms, the springs being arranged to extend circumferentially alternately with said radial arms so as to act in parallel, and wherein the number of said springs is at most three.

4. A damped flywheel comprising a primary part, a secondary part, means mounting said primary and secondary parts coaxially with each other and rotatably with respect to each other, a first annular component associated with the primary part, a second annular component associated with the secondary part, resilient means disposed between and in engagement with said first and second annular components for angular displacement therebetween, and means mounting said first annular component for defining a dead clearance in which there is no operation of the resilient means during the angular displacement between said primary and secondary parts while the dead clearance is being taken up in such a way to be freely rotatable with respect to the primary part, said primary and secondary part and first annular component comprising abutment means for defining a predetermined range of angular displacement for said dead cleareance, the first annular component comprising two rings disposed on either side of the second annular component, said primary part defining a cage for angular displacement of said rings in the cage and transverse walls of the cage, at least one of said ring having at least one axially projecting boss, at least one said transverse wall defining at least one abutment surface fixed with respect thereto for abutting engagement in the circumferential direction with a corresponding said boss.

5. A damped flywheel according to claim 4, wherein said resilient means comprise a plurality of springs spaced apart circumferentially, with said boss and said abutment surface being disposed on a pitch circle defined radially inwards of the pitch circle of said springs.

6. A damped flywheel according to claim 5, wherein said boss comprises a pad carried on the corresponding said ring.

7. A damped flywheel according to claim 6, further comprising a plurality of spacers securing said rings together at intervals for simultaneous rotation, and where said pad is carried on the corresponding said ring by at least one of said spacers.

8. A damped flywheel according to claim 5, wherein the said first annular component is so orientated rotationally as to be spaced circumferentially from each of said abutment surfaces when the flywheel is in a rest condition.

* * * * *